Patented Aug. 7, 1945

2,381,137

UNITED STATES PATENT OFFICE 2,381,137

PROCESS OF PREPARING TETRAKIS-2-CHLOROETHYL SILICATE

Winton I. Patnode and Robert O. Sauer, Schenectady, N. Y., assignors to General Electric Company, a corporation of New York No Drawing. Application May 14, 1942, Serial No. 443,022

3 Claims. (Cl. 260—462)

The present invention relates to a process of preparing tetrakis-2-chloroethyl silicate.

It was known prior to our invention that tetrakis-ethyl silicate could be prepared by reacting silicon tetrachloride with ethyl alcohol. It was also known that silicon tetrachloride would react with polyhydric alcohols or chlorinated alcohols to produce esters of silicic acid. For example Taurke [Ber. 38, 1661 (1905); Ann. 143, 217 (1905)] reported the preparation of a compound giving satisfactory silicon, carbon, and hydrogen analysis for the structure

by reacting ethylene glycol with silicon tetrachloride. The compound was reported by Taurke as being a water-white liquid having a boiling point of 177–180° C. at 8 mm. pressure. In each of these reported reactions involving the chlorine atoms of the silicon chloride and the hydroxyl groups of the alcohols, hydrogen chloride is a gaseous reaction product. As four mols of hydrogen chloride gas is evolved for each mol of the tetraester of silicic acid, provision must always be made for disposal of this undesired product.

We now have discovered that tetrakis-2-chloroethyl silicate may be readily prepared, without the evolution of hydrogen chloride, by causing ethylene oxide to react with silicon tetrachloride. The reaction between the ethylene oxide and the silicon tetrachloride may be expressed by the equation

Since even freshly distilled silicon tetrachloride contains a small but apprecable concentration of hydrogen chloride, the dissolved hydrogen chloride probably behaves as a catalyst for the reaction. At least, the rate of reaction can be increased when desired by increasing the concentration of the hydrogen chloride. However, as can be seen from the equation, no additional hydrogen chloride is formed or evolved during the reaction.

In order that those skilled in the art better may understand how our invention may be carried into effect, the following specific examples are given illustrating the preparation of tetrakis-2-chloroethyl silicate.

Example I

A two-necked flask of 1 liter capacity was equipped with (1) a water-jacketed bulb reflux condenser packed with glass beads and fitted with a calcium chloride tube, and (2) an inlet tube reaching to the bottom of the flask. Three mols (510 g.) of redistilled silicon tetrachloride boiling at 57–57.5° C. were placed in the flask. Ethylene oxide was slowly introduced through the inlet tube into the liquid silicon tetrachloride held at refluxing temperatures by means of a hot plate. After 15 hours no more reflux was observed at this rate of heating and the temperature had risen considerably over 100°, causing some discoloration. At this point the heating unit was removed, and the gas was bubbled through the reaction mass more slowly until the active chlorine content was reduced to 0.7% as shown by titration with aqueous alkali. This required an additional period of 15 hours. The product was fractionated at reduced pressure (6.5–7 mm.) yielding about 900 grams of tetrakis-2-chloroethyl silicate and about 85 grams of a dark liquid residue boiling with decomposition at about 220° C. at 1 mm. pressure.

Example II

Into a 1-liter, three-necked flask, bearing a water-cooled reflux condenser packed with glass beads, a thermometer and a capillary tube for the introduction of the ethylene oxide gas, was placed 68 g. (0.4 mol) of redistilled silicon tetrachloride. The slow addition of ethylene oxide was begun and the reaction vessel surrounded by a warm water bath. Heat was applied at such a rate as to keep the lower portion of the condenser flooded. After ethylene oxide had been introduced for 1½ hours, no more silicon tetrachloride refluxed and the temperature rose to 70°. Heating the water bath to 80–90° caused the temperature of the reaction mass to rise to 95–100°. Keeping the bath boiling, the addition of ethylene oxide was continued for 1½ hours longer. At this time the flow of ethylene oxide was stopped, and after cooling, the flask and contents was found to have gained 72.7 g. in weight. Titration of a sample with aqueous alkali indicated 0.14% active chlorine present. Distillation in vacuo gave 102 g. (73.6%) of chloroethyl silicate, B. P. 153–154° at 2 mm. and 144–147 at 0.8 mm.

The reaction between the boiling silicon tetrachloride and the ethylene oxide, proceeds slowly at first. After approximately two mols of ethylene oxide have been absorbed per mol of silicon tetrachloride the reaction proceeds much more rapidly and with the evolution of so much heat that no external heating is required to maintain the reaction temperature at 90–100°. It is notable that at this stage of the reaction no silicon tetrachloride may be distilled from the reaction mixture even at 100°, indicating a step-wise replacement of the chlorine atom attached to silicon and the formation of intermediate compounds such as $ClCH_2CH_2OSiCl_3$, $(ClCH_2CH_2O)_2SiCl_2$ and $(ClCH_2CH_2O)_3SiCl$. The increase in the rate of absorption of ethylene oxide during the later stages is probably due to the higher reaction temperature which can be maintained in the absence of the low-boiling silicon tetrachloride.

The reaction product is usually slightly discolored but a single distillation at reduced pressure (1-5 mm.) is sufficient to give a good yield of from 73 to 87% of a water-white product. A small forerun, presumably of compounds of the type $(RO)_nSiCl_{4-n}$, is usually obtained, but no appreciable residue remains except, as in the case of Example I, when the reaction temperature is allowed to rise above 100-110°.

Samples of chloroethyl silicate, sealed in vacuo, were maintained at 50°, 100° and 150° for thirteenth days. Although a slight discoloration of the samples kept at 150° and 100° was observed, decomposition into acidic fragments was negligible, as shown by titration of these samples with aqueous alkali. Experiments on the hydrolysis of this compound indicated greater reactivity than ethyl silicate, making the chloroethyl product a particularly useful substitute for ethyl or higher silicates in any of their hydrolysis applications.

What we claim as new and desire to secure by Letters Patent of the United States is:

1. The process of preparing tetrakis-2-chloroethyl silicate which comprises reacting ethylene oxide with silicon tetrachloride at an elevated temperature.

2. The process of preparing tetrakis-2-chloroethyl silicate which comprises reacting ethylene oxide with silicon tetrachloride at an elevated temperature in the presence of a small amount of hydrogen chloride catalyst.

3. The process of preparing tetrakis-2-chloroethyl silicate which comprises slowly introducing ethylene oxide into silicon tetrachloride held at reflux temperatures until no further refluxing is obtained, increasing the temperature of the reaction mass to 100° C. and continuing the addition of ethylene oxide until the reaction mass contains substantially no active chlorine.

WINTON I. PATNODE.
ROBERT O. SAUER.